Dec. 3, 1968 C. R. WARBURTON 3,414,827

FREQUENCY-SHIFT DATA RECEIVER

Filed June 30, 1965 2 Sheets-Sheet 1

INVENTOR
CLIVE ROWLAND WARBURTON
BY
Kinkelstein, Kinkelstein & Ottinger
ATTORNEYS Dec. 3, 1968 C. R. WARBURTON 3,414,827

FREQUENCY-SHIFT DATA RECEIVER

Filed June 30, 1965 2 Sheets-Sheet 2

INVENTOR
CLIVE ROWLAND WARBURTON
BY
Kirchstein, Kirchstein & Ottinger
ATTORNEYS

United States Patent Office 3,414,827

Patented Dec. 3, 1968

3,414,827

FREQUENCY-SHIFT DATA RECEIVER

Clive Rowland Warburton, Coventry, England, assignor to The General Electric Company Limited, London, England Filed June 30, 1965, Ser. No. 468,330
Claims priority, application Great Britain, July 3, 1964, 27,553/64
7 Claims. (Cl. 329—134)

ABSTRACT OF THE DISCLOSURE

A frequency-shift binary data receiver in which the received signal is passed, after amplitude limiting, through a frequency-responsive circuit to a transistor switch. For one of the two input frequencies, the signal passed to the transistor switch is of sufficient amplitude to cause the switch to be "closed" for part of each cycle of that signal whereas the signal of the other input frequency is of insufficient amplitude to "close" that switch at all. The signal passed by the transistor switch is rectified to provide the output data signal. The frequency-responsive circuit is formed by a single tuned circuit having a resonant frequency lying outside the range of frequencies of the input signal to the receiver.

This invention relates to frequency discriminators for use in electric signal receivers.

More particularly this invention relates to frequency discriminators of the type for use in electric signal receivers which, during use, form part of a data transmission system (for example a telegraphy system) using frequency-shift signalling.

In one such system information is transmitted by the transmission of a voice frequency signal which, at any instant, may have either one of two different frequencies, the frequency of the transmitted signal being keyed between these two different frequencies in dependence upon the information being transmitted.

At the receiver the transmitted signal is used to control an output relay in dependence upon the frequency of the transmitted signal at any instant, and it is an object of the present invention to provide apparatus which may be used for this purpose.

According to one aspect of the present invention, a frequency discriminator of the type specified comprises a single frequency responsive circuit to which, during use, the input signal to the frequency discriminator is supplied, and means responsive to the amplitude of the output signal supplied by said frequency responsive circuit, the arrangement being such that when, during use, an input signal which at any instant may have either one of two different frequencies is supplied to said frequency discriminator it does or does not supply an output signal in dependence upon the frequency of said input signal.

Said means responsive to the output signal supplied by said frequency responsive circuit may comprise switch means that is arranged to be either conducting or non-conducting in dependence upon the instantaneous amplitude of the signal supplied thereto, the arrangement being such that when said input signal has one of its said two frequencies said switch means is rendered conducting for part of the cycle of said input signal, but when said input signal has the other of its said two frequencies said switch means remains non-conducting for the whole of the cycle of said input signal, said switch means thus providing either a square-pulse output signal or no output signal in dependence upon the frequency of said input signal.

According to another aspect of the present invention a frequency discriminator of the type specified comprises a transistor having three electrodes, a first resistive element connecting a first electrode of said transistor to a first point, a second resistive element connecting the first electrode of said transistor to a second point, a third resistive element connecting a second electrode of said transistor to said second point. a tuned circuit which comprises an inductive element and a capacitive element connected in parallel and which is connected in a path between the third electrode of said transistor and said first point, means to derive an output signal from the second electrode of said transistor, and means to provide a potential difference between said first and second points, the arrangement being such that when, during use, an input signal which at any instant may have either one of two different frequencies is supplied to said frequency discriminator across said tuned circuit, said transistor is rendered conducting for part of the cycle of said input signal when said input signal has one of its said two frequencies, but remains non-conducting for the whole of the cycle of said input signal when said input signal has the other of its said two frequencies, said transistor thus operating to supply either a square pulse output signal or no output signal in dependence upon the frequency of said input signal.

One embodiment of an electric telegraph receiver, for use in a telegraphy system using frequency-shift signalling, the receiver including a frequency discriminator in accordance with the present invention, will now be described by way of example with reference to the accompanying drawings in which.

Figure 2:
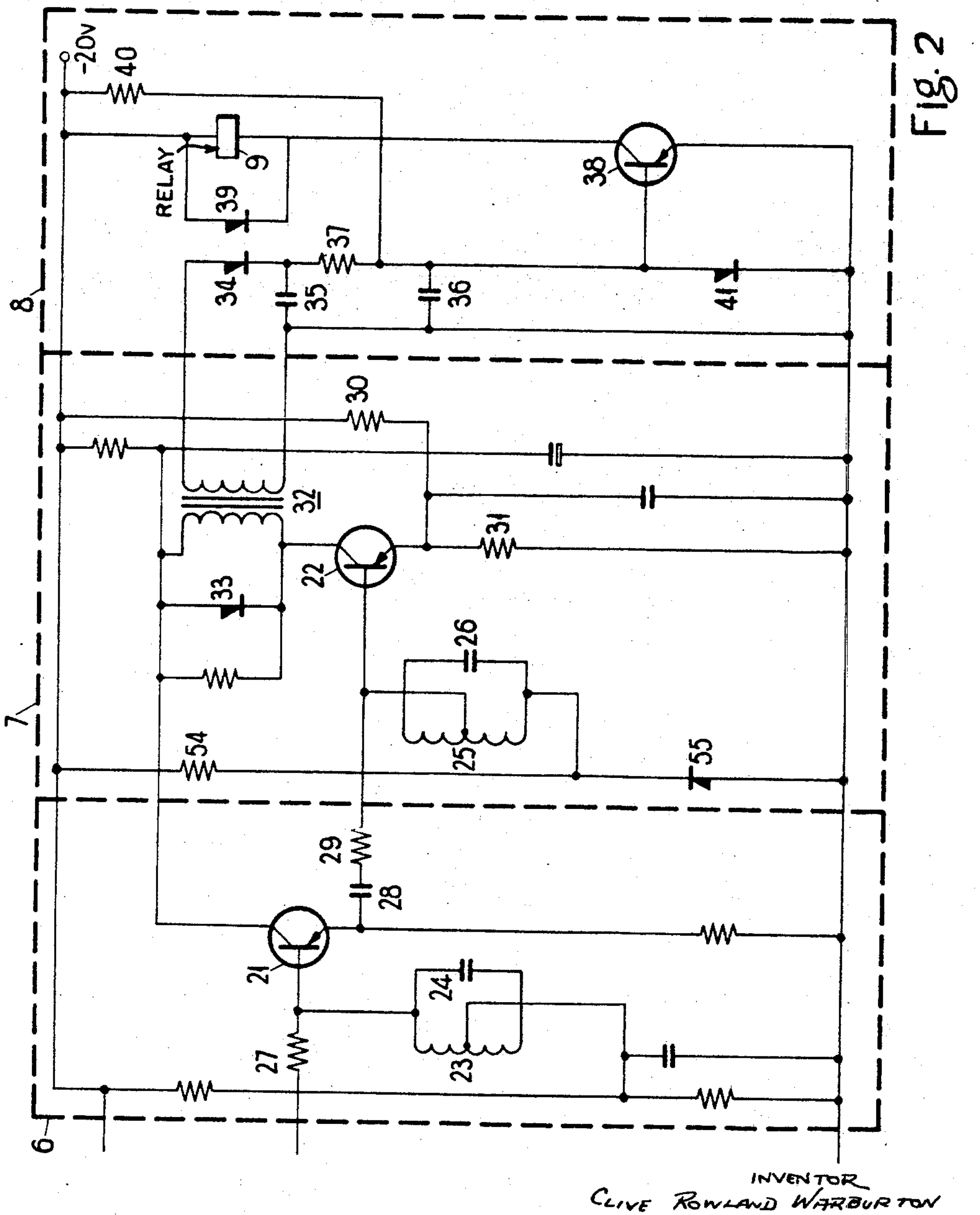
FIGURE 2 is a circuit diagram of the remainder of the receiver, including the frequency discriminator.

Referring now to the drawings, the received voice frequency signal, which at any instant has one or other of two frequencies which are 30 cycles per second above and 30 cycles per second below the mid-channel frequency respectively in dependence upon the information being transmitted, is supplied to input terminals 1 and 2, from which it passes by way of an appropriate bandpass filter 3 to an amplifier stage 4. The output signal from the amplifier stage 4 is supplied to the amplitude discriminator 5 which, during normal operation of the receiver, operates to supply an output signal which is a square-wave signal, the frequency of which is at any instant the same as that of the received signal. The output signal from the amplitude discriminator 5 is supplied by way of a filter and buffer stage 6 (FIGURE 2) to a frequency discriminator and detector stage 7 which supplies a square pulse output signal which is supplied to an output stage 8 where it is rectified and utilised to control the condition of an output relay 9.

During normal operation of the receiver the condition of the relay 9 at any instant is dependent upon the frequency of the received signal, the relay 9 being released when the received signal has its higher frequency and operated when the received signal has its lower frequency, or vice versa if required.

The relay 9 is preferably a mercury wetted reed relay in order that it will give reliable working at the speed of operation required, and long life.

If the amplitude of the received signal falls to a certain value below which the ereceiver is not required to operate the relay 9 is clamped in the operated condition irrespective of the frequency of the received signal.

Referring now to the amplifier stage 4 in more detail, this comprises two p-n-p junction transistors 10 and 11 both connected as common-emitter configuration amplifiers, the output signal from the collector electrode of the transistor 10 being supplied as the input signal to the base electrode of the transistor 11. A negative feedback path, comprising a resistor 12, two silicon diodes 13 and 14, and a capacitor 15, is connected between the collector electrode of the transistor 11 and the emitter electrode of the transistor 10. This feedback path operates so that, when the peak signal amplitude appearing at the junction of the resistor 12 and the diodes 13 and 14 exceeds the voltage to the "knee" of the voltage/current characteristic of the diodes 13 and 14, these diodes alternately pass appreciable current as feedback to the transistor 10 during alternate half cycles of the signal. Overall this has the effect of reducing the peak amplitude of the output signal supplied by the amplifier stage 4.

Referring now to the amplitude discriminator 5 in more detail, this comprises a pair of p-n-p junction transistors 16 and 17 connected together with a common emitter electrode load resistor 53 so as to operate together in known manner as a triggered bistable arrangement. Thus resistors 47 and 48 are connected in the collector electrode circuits of the transistors 16 and 17, the collector electrode of the transistor 16 is coupled to the base electrode of the transistor 17 by way of a capacitor 49 and a resistor 50, and resistors 51 and 52 are provided in the base electrode circuits of these two transistors respectively.

The output signal from the amplifier stage 4 is supplied by way of a resistor 19 and a capacitor 20 to the base electrode of the transistor 16. On the positive-going half cycles of the signal from the amplifier stage 4, the transistor 16 becomes non-conducting, the transistor 17 thus becoming conducting, and on the negative going half cycles of this signal the transistor 16 becomes conducting and the transistor 17 becomes non-conducting. The transistors 16 and 17 are arranged such that the amplitude of the signal supplied to the base electrode of the transistor 16 has to be above a predetermined value in order to effect triggering of the bistable arrangement. The gain of the amplifier stage 4 is set such that if the amplitude of the received signal is below a certain value, the amplitude of the signal supplied to the base electrode of the transistor 16 is below the predetermined value, and the bistable arrangement is thus not triggered.

Thus, for received signals which have an amplitude above a certain value the amplitude discriminator stage 5 supplies a square wave output signal the frequency of which is, at any instant, the same as that of the received signal, this output signal being derived from the collector electrode of the transistor 17. If the amplitude of the received signal falls below the certain value the bistable arrangement is not triggered, and the amplitude discriminator stage 5 does not supply any output signal.

Referring now to the filter and buffer stage 6 (FIGURE 2) in more detail, this comprises a p-n-p junction transistor 21 with a tuned circuit comprising an inductor 23 and a capacitor 24 connected across its base-emitter junction. The tuned circuit formed by the inductor 23 and the capacitor 24 is tuned to the mid-channel frequency of the received signal and operates as a band-pass filter removing the harmonics from the signal which is supplied by the amplitude discriminator stage 5 to the base electrode of the transistor 21 by way of a resistor 27. The transistor 21 operates in known manner as an amplifier, and the output signal from the filter and buffer stage 6 is derived from the emitter electrode of the transistor 21 by way of a capacitor 28 and a resistor 29.

Referring now to the frequency discriminator stage 7 in more detail, this comprises a p-n-p junction transistor 22 with a tuned circuit comprising an inductor 25 and a capacitor 26 connected across its base-emitter junction. The output signal from the filter and buffer stage 6 is supplied to the base electrode of the transistor 22.

The tuned circuit formed by the inductor 25 and the capacitor 26 is tuned to a frequency which is 55 cycles per second higher than the mid-channel frequency of the received signal. Thus, the arrangement is such that when the received signal has its higher frequency the amplitude of the signal supplied to the base electrode of the transistor 22 is greater than that when the received signal has its lower frequency.

The transistor 22 has a fixed emitter bias which is determined by resistors 30 and 31, and this bias is set such that the amplitude of the signal supplied to the base electrode of the transistor 22 when the received signal has its mid-channel frequency is just sufficient to render the transistor 22 partially conducting.

Thus, when the received signal has its higher frequency the transistor 22 is fully conducting for part of the cycle of the received signal, and supplies a square pulse signal at its collector electrode, but when the received signal has its lower frequency the transistor 22 is not conducting during any part of the cycle of the received signal, and does not supply any output signal.

The signal appearing at the collector electrode of the transistor 22 is supplied to the primary winding of a transformer 32, and the output signal from the frequency discriminator and detector stage 7 is derived from across the secondary winding of the transformer 32.

A diode 33 is connected across the primary winding of the transformer 32 as a path for any voltage surges due to the inductance of the transformer 32.

Referring now to the output stage 8 in more detail, the signal appearing across the secondary winding of the transformer 32 is rectified by a diode 34, and then smoothed by a network comprising capacitors 35 and 36, and a resistor 37 before being supplied to the base electrode of a p-n-p junction transistor 38. The transistor 38 has the relay 9 connected to its collector electrode, the relay 9 being shunted by a diode 39 which acts as a path for any voltage surges due to the inductance of the relay 9.

When there is no signal appearing across the secondary winding of the transformer 32, i.e. when the received signal has its lower frequency, the bias applied to the base electrode of the transistor 38 is determined by a resistor 40 and a diode 41, and is such that the transistor 38 is conducting, and current is supplied to the relay 9 such that it is operated. When the received signal has its higher frequency, the signal appearing across the secondary winding of the transformer 32 is such as to render the transistor 38 non-conducting, and no current is supplied to the relay 9 and it is released.

Thus at any instant during normal operation of the receiver the condition of the relay 9 is characteristic of the frequency of the received signal, the relay 9 being operated when the received signal has its lower frequency and released when it has its higher frequency.

Further, as previously described, if the amplitude of the received signal falls below a certain value the amplitude discriminator stage 5 does not supply any output signal, and thus no signal appears across the secondary winding of the transformer 32 in the frequency discriminator and detector stage 7, and the relay 9 remains in the operated condition irrespective of the frequency of the received signal.

Figure 3:
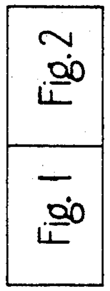
FIGURE 3 is a diagram showing how to arrange FIGURES 1 and 2 with respect to one another to give the complete circuit.
Figure 1:
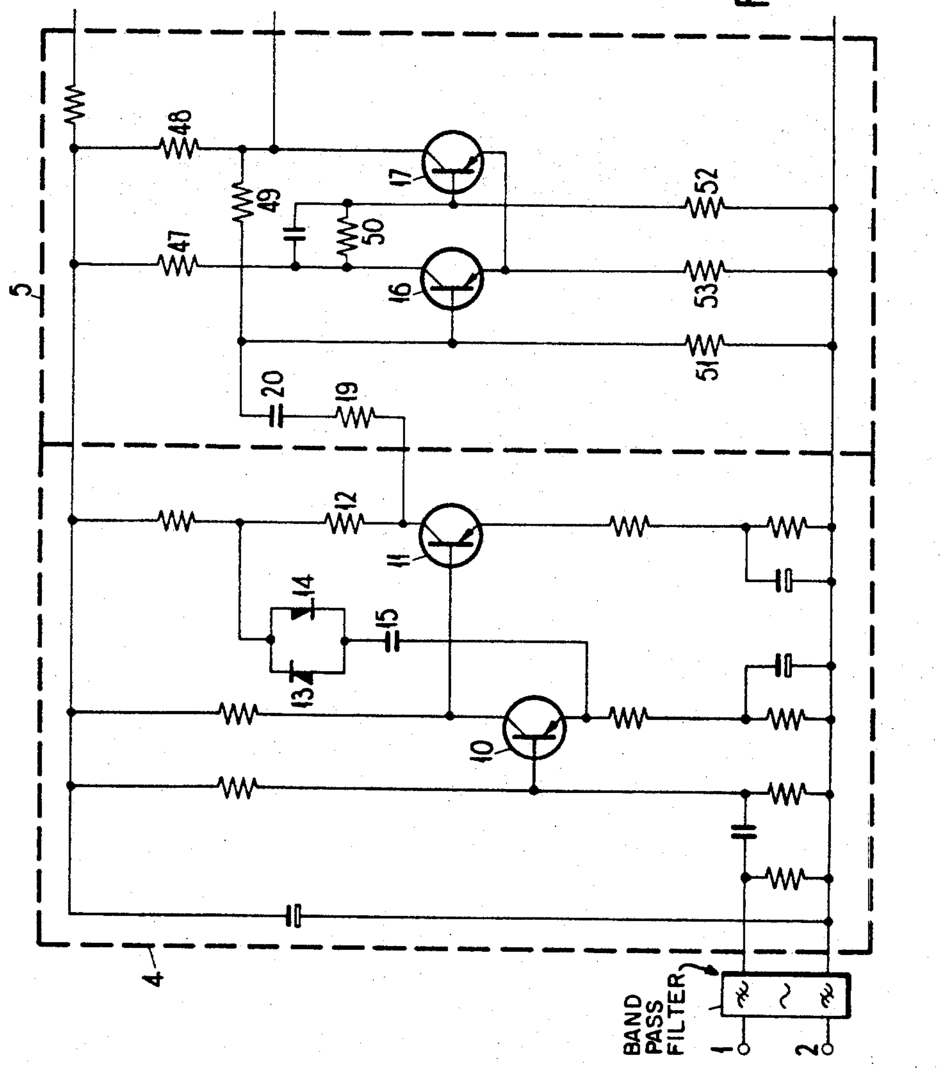
FIGURE 1 is a circuit diagram of part of the receiver.
Figure 4:
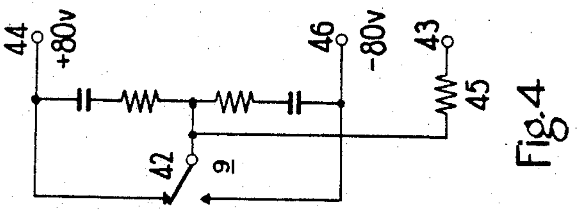
FIGURE 4 shows the output circuit of the receiver.

Referring now to FIGURE 4, contacts 42 of the relay 9 operate to control the potential of the final output signal supplied by the receiver at output terminal 43. When the relay 9 is released its contacts 42 connect a +80 volts supply from a terminal 44 to the output terminal 43 by way of a resistor 45, and when the relay 9 is operated its contacts 42 connect a −80 volts supply from a terminal 46 to the output terminal 43 by way of the resistor 45.

By returning the tuned circuit formed by the inductor 25 and the capacitor 26 to a frequency which is 55 c./s. below the mid-channel frequency of the received signal, the frequency discriminator and detector stage 7 may be arranged to supply an output signal when the received signal has its lower frequency and not when it has its higher frequency. The relay 9 is thus now operated when the received signal has its higher frequency, and released when it has its lower frequency, the relay 9 still being held operated if the amplitude of the received signal should fall below the certain value.

The reciver may be modified alternatively to clamp the relay 9 in the released condition if the amplitude of the received signal falls below the certain value. In this case the biasing of the transistor 38 is arranged such that the transistor 38 is non-conducting when there is no signal appearing across the secondary winding of the transformer 32, and the connections of the diode 34 are arranged such that the transistor 38 is conducting when there is a signal appearing across the secondary winding of the transformer 32.

In one example of the receiver described above, preferred values for some of the components are given below:

| | Ohms |
|---|---|
| Resistors **47** and **48** | 3,000 |
| Resistors **49** and **50** | 36,000 |
| Resistors **51** and **52** | 8,200 |
| Resistor **53** | 75 |

An alternative method to the one described above of switching the bistable arrangement, comprising the transistors 16 and 17, in the amplitude discriminator stage 5, is to modify the connections to the transistor 11 in the amplifier stage 4 such that it operates as a phase splitter, and to switch the bistable arrangement by means of the two anti-phase signals supplied thereby. This is accomplished by providing a path comprising a resistor and a capacitor connected in series between the emitter electrode of the transistor 11 and the base electrode of the transistor 17, and adjusting the values of the emitter and collector electrode load resistances of the transistor 11 to the same value.

The detector stage 7 may be modified by connecting the junction of the resistor 54 and the crystal diode 55 to the centre tapping of the inductor 25 instead of to one end thereof. The base electrode of the transistor 22 is then connected to one end of the tuned circuit formed by the inductor 25 and the capacitor 26 while the base electrode of a further transistor is connected to the other end of this tuned circuit, the emitter and collecor electrodes of the further transistor being connected respectively to the emitter and collector electrodes of the transistor 22. With this modified arrangement it will be appreciated that one or other of the transistor 22 and the further transistor is caused to conduct during every half cycle of the input oscillations so that the diode 34 then conducts during every half cycle (as compared with only conducting during alternate half cycles in the previous arrangement).

I claim:

1. A frequency-shift data receiver for receiving an input signal having selectively one or other of two frequencies. said receiver comprising an input path, a frequency-to-amplitude conversion circuit comprising a single tuned circuit having a resonant frequency outside the range of frequencies of said input signal, an amplitude limiter connected between said input path and said conversion circuit, rectifier means, and amplitude-dependent circuit means which is connected between said conversion circuit and said rectifier means to pass to said rectifier means only signals supplied by said conversion circuit having an amplitude exceeding a pre-determined value so that the rectifier means supplies a signal when the input signal to the receiver has one of its two frequencies and supplies no such signal when the input signal has the other frequency.

2. A frequency-shift data receiver according to claim 1 wherein said amplitude-dependent circuit means comprises a transistor having an emitter, a collector, and a base electrode, circuit means to pass a signal supplied by said conversion circuit to the base electrode of the transistor, means to supply a substantially stable bias potential to the emitter electrode of the transistor, and circuit means connected to the collector electrode of the transistor for supplying the output signal of the amplitude-dependent means to said rectifier means.

3. A frequency-shift data receiver comprising an input path, a frequency-to-amplitude conversion circuit having only a single tuned circuit comprising an inductive element connected in parallel with a capacitive element, circuit means coupling the input path and the conversion circuit, rectifier means, an amplitude-dependent circuit connected between said conversion circuit and said rectifier means to pass to the rectifier means only signals supplied by the conversion circuit having an amplitude exceeding a pre-determined value so that the rectifier means supplies a signal having selectively one or other of two steady voltage values in dependence upon the frequency of signals supplied over said input path, and a relay that is connected to said rectifier means and is responsive to the signal voltage supplied thereby.

4. In a frequency-shift data receiver, a frequency discriminator comprising a transistor having three electrodes, a first resistive element connecting a first electrode of said transistor to a first point, a second resistive element connecting the first electrode of said transistor to a second point, a third resistive element connecting a second electrode of said transistor to said second point, a single tuned circuit which comprises an inductive element and a capacitive element connected in parallel and which is connected in a path between the third electrode of said transistor and said first point, means to derive an output signal from the second electrode of said transistor, and means to provide a potential difference between said first and second points, the arrangement being such that when, during use, an input signal which at any instant may have either one of two different frequencies is supplied to said frequency discriminator across said tuned circuit, said transistor is rendered conducting for part of the cycle of said input signal when said input signal has one of its said two frequencies, but remains non-conducting for the whole of the cycle of said input signal when said input signal has the other of its said two frequencies, said transistor thus operating to supply either a square pulse output signal or no output signal in dependence upon the frequency of said input signal.

5. A frequency discriminator according to claim 4 wherein said transistor is a junction transistor having an emitter electrode, a collector electrode and a base electrode, said first electrode being the emitter electrode, said second electrode being the collector electrode, and said third electrode being the base electrode.

6. A frequency discriminator according to claim 4 wherein said means to derive an output signal from the second electrode of said transistor comprises a transformer having a primary winding and a secondary winding. said primary winding being connected between the second electrode of said transistor and said second point and said output signal being derived from across said secondary winding of said transformer.

7. A frequency discriminator according to claim 4 wherein the resonant frequency of said tuned circuit is to one side of said two frequencies of said input signal.

References Cited

UNITED STATES PATENTS

| | | | |
|---|---|---|---|
| 2,507,730 | 5/1950 | Mitchell | 325—320 |
| 3,119,065 | 1/1964 | Blake | 325—319 |
| 3,163,826 | 12/1964 | Kemper | 329—103 |

ALFRED L. BRODY, *Primary Examiner*.